United States Patent [19]
Farris

[11] Patent Number: 5,915,639
[45] Date of Patent: Jun. 29, 1999

[54] LARGE ARBOR FLY FISHING REEL AND DRAG SYSTEM

[75] Inventor: Mark S. Farris, Ketchum, Id.

[73] Assignee: C1 Design Group, Ketchum, Id.

[21] Appl. No.: 08/926,178

[22] Filed: Sep. 9, 1997

Related U.S. Application Data

[60] Provisional application No. 60/019,760, Sep. 9, 1996.

[51] Int. Cl.[6] .................................................. A01K 89/02
[52] U.S. Cl. ........................... 242/295; 242/303; 242/317; 43/20; 43/22; 43/23; D22/138; D22/141
[58] Field of Search .................................. D22/137, 138, D22/140, 141, 142; 242/295, 302, 303, 317; 43/18.1, 20, 22, 23

[56] References Cited

U.S. PATENT DOCUMENTS

| | | | |
|---|---|---|---|
| 1,272,361 | 7/1918 | Bergevin | 43/20 X |
| 1,452,808 | 4/1923 | Lee . | |
| 2,035,279 | 3/1936 | Shakespeare, Jr. | 242/302 X |
| 2,334,646 | 11/1943 | Price . | |
| 2,471,723 | 5/1949 | Cannon . | |
| 2,559,433 | 7/1951 | Hurd | 43/20 X |
| 3,229,406 | 1/1966 | Binkley | 43/18.1 X |
| 3,557,483 | 1/1971 | Wilson | 43/20 |
| 4,014,127 | 3/1977 | Turner | 43/20 X |
| 4,720,056 | 1/1988 | Danielsson . | |
| 4,878,309 | 11/1989 | Gough | 43/18.1 |
| 5,211,273 | 5/1993 | Castens | 192/45 |
| 5,237,770 | 8/1993 | Creek | 43/20 |
| 5,557,875 | 9/1996 | Testa | 43/20 |
| 5,626,303 | 5/1997 | Bringsen | 242/295 X |

FOREIGN PATENT DOCUMENTS

| | | | |
|---|---|---|---|
| 484805 | 7/1952 | Canada | 43/20 |
| 831502 | 12/1937 | France | 43/20 |

OTHER PUBLICATIONS

Mt. Ranier Flyreel Works.

*Primary Examiner*—Donald P. Walsh
*Assistant Examiner*—Emmanuel M. Marcelo
*Attorney, Agent, or Firm*—Lyon & Lyon LLP

[57] ABSTRACT

A fly fishing reel comprises a large diameter spool having a broad width and a shallow line storage depth. The reel may have an arm-like body and a unique mounting member which, when attached to a fishing rod, positions the perimeter of the spool across a longitudinal axis of the rod. In an additional aspect, a drag mechanism is provided in a center hub of the spool. The drag mechanism is a unidirectional dual cone drag mechanism. The drag mechanism comprises a pair of opposing frictional conical race members, an inner race member inserted into an outer race member. The race members are biased into contact to create drag on the rotating spool. A roller clutch is utilized to produce a unidirectional drag mechanism. The roller clutch is configured to lock thereby causing relative rotation of the race members creating frictional drag only when the spool is rotated in the "reeling out direction."

22 Claims, 11 Drawing Sheets

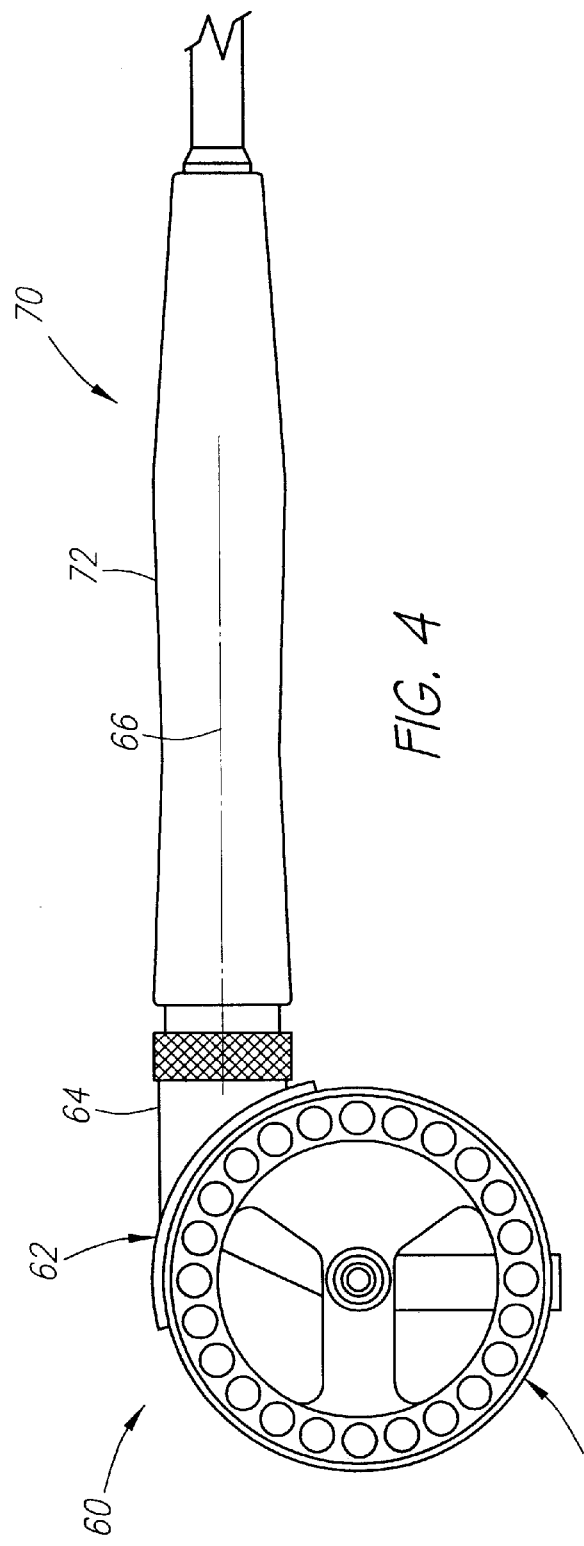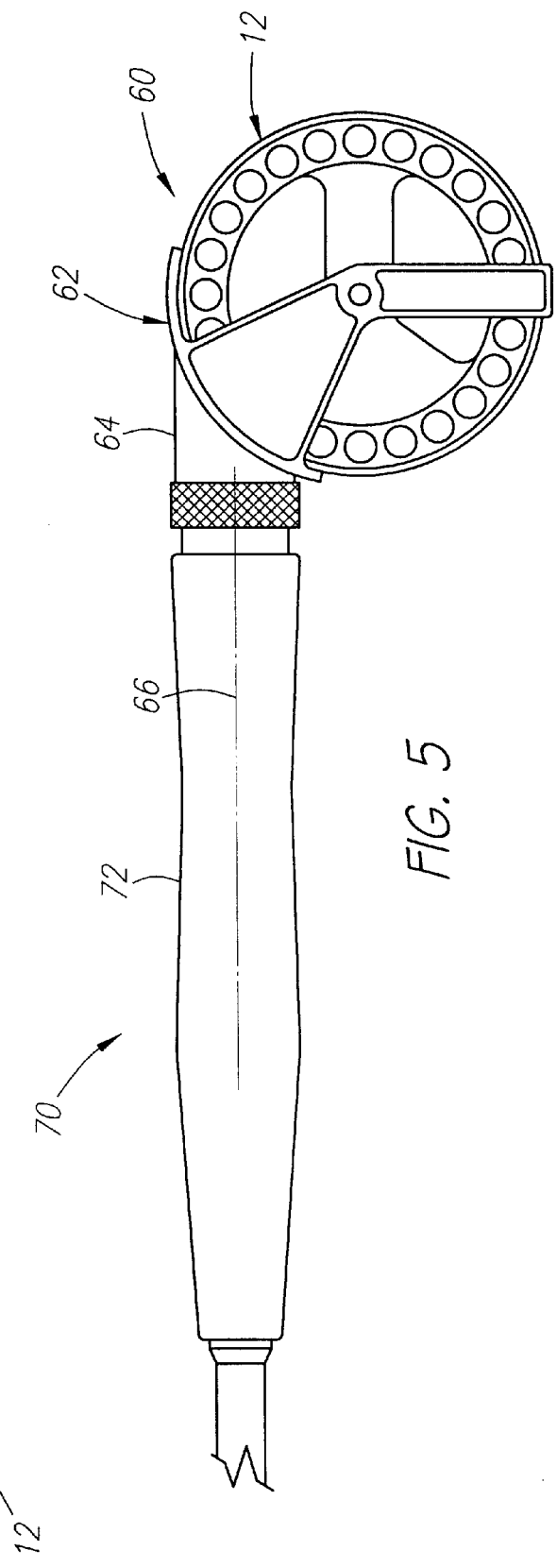

LARGE ARBOR FLY FISHING REEL AND DRAG SYSTEM

FIELD OF THE INVENTION

This is a continuation-in-part of U.S. provisional application Ser. No. 60/019,760, filed on Sept. 9, 1996, the disclosure of which is expressly incorporated herein by reference in its entirety.

This invention relates to fishing reels, and more particularly to improvements in fly fishing reels such as providing an improved large arbor spool, an improved mounting configuration and an innovative drag mechanism.

BACKGROUND OF THE INVENTION

Fly fishing is a popular and rapidly growing sport. Fly fishing equipment typically includes a fly reel attached to a fly rod, and fly line. A portion of the fly line is wound onto the reel, and another portion is typically threaded through eyelets on the rod. The other end of the fly line is joined to the "fly." In this sport, an artificial fly is usually used as bait. The artificial fly is dressed to simulate an insect and typically comprises a fish hook fabricated with fur, feathers, or the like, in order to resemble an insect, or other forage, preferred by fish.

When performing the activity of fly fishing, the fisherman projects or "casts" the fly to an area where fish are expected to be. It is often necessary to cast the fly a substantial distance away because fish are easily frightened away from a fisherman or a boat. Moreover, it is sometimes desirable to be able to cast into an area which is not easily accessible to the fisherman's person or his boat.

The flies used in fly fishing are extremely light weight and consequently, the fly line makes up virtually all of the casting weight. Hence, effective fly casting comes down to the ability to efficiently propel a portion of line through the air. The most common technique is performed by holding the rod and reel in one hand and at the same time holding and feeding the line from the reel in the other hand while swinging the rod back and forth creating a loop of fly line between the end of the rod and the fly. Then, a forward casting motion, similar to a whipping motion, is executed and the line is released, propelling the line and the fly across the water. The fly line acts somewhat like a whip in order to propel the line and fly a distance away from the fisherman. The artificial fly is then manipulated in the water to lure and hook a fish.

Fly casting is an extremely dexterous skill involving very subtle arm and wrist movements and is usually learned only after a long period of practice and refinement. Fly casting involves such a fluid, delicate and precise motion, that it is often described as an art form. Moreover, during a day of fly fishing, a fisherman can often make more than a thousand casts. With this in mind, it can be seen that the overall weight and proper balance of a fly fishing rod and reel assembly are critically important.

Due to the desirability of light weight and proper balance of the rod and reel assembly, conventional fly fishing reels have been relatively small in size, having both a small spool diameter and a narrow spool width. Conventional fly fishing reels have inner spool diameters designed only large enough to accommodate an axle and may be as small as one-half inch in diameter. Typical spool widths are about ¾". The small spool diameter and narrow spool involve several significant drawbacks. Firstly, the small diameter causes sizable plastic deformation ("line memory") of the fly line wound on the small diameter spool. This effect is similar to the characteristics seen in a coiled spring. Line memory is undesirable because it can cause tangling of the line and snagging in the rod guides. This effect is worsened by the fact that the narrow spool requires that the spool also be very deep in order to hold sufficient line which creates an even smaller inner spool diameter. Thus, the line at the innermost diameter of the spool has a very small winding radius.

Secondly, with a narrow spool, the spool must also be deep in order to provide storage capacity for a sufficient amount of line. The ratio of the spool width to the depth of line is termed the line-storage aspect ratio. In other words, the narrower the spool, the greater the depth of spool line needed resulting in a small aspect ratio. Typical fly fishing reels have line storage depths greater than one inch (1"), and usually greater than 1–½". The drag torque on the spool of fishing reels tends to be nearly constant. As a result, as line is reeled on or off the reel, the tension on the line changes as the radius of the line on the spool changes. For instance, as more and more line is reeled off, the tension on the line increases as the diameter of the line on the spool decreases because the drag torque remains roughly constant unless manually adjusted. The narrower and deeper the spool, the greater is the change in the drag torque for a given amount of line change on the spool. Because both of the fisherman's hands are usually occupied with the rod and line while fly fishing, it is inconvenient and cumbersome to adjust the reel drag. Therefore, it is impractical to frequently adjust the reel drag while reeling in or letting out line to compensate for the changes in the radius of the line on the spool.

In addition, the small spool diameter results in slower line retrieval for a given rotational winding speed of the spool. To increase the winding speed of the spool, some fly fishing reels are equipped with a transmission system, usually consisting of reduction gears between the spool and the hand crank. However, a transmission system makes the reel assembly more complex, adds parts, and increases weight.

To address the problems of slow line retrieval speed and plastic line deformation, a reel having an increased diameter spool has been disclosed in U.S. Pat. No. 4,720,056. The disclosed spool retains the narrow width of conventional reel designs, thereby requiring a relatively deep spool. The reel described therein has exposed bearing rollers for providing drag on the spool. The rollers, however, produce the same amount of drag in both rotational directions so that the fisherman must reel against the drag when retrieving line. This is a highly undesirable result. Furthermore, the increased diameter reel is attached using the conventional configuration having a "foot" extending from the top extremity of the reel circumference. The scat clamps to the rod. In this configuration, increasing the diameter of the reel moves the center of mass of the reel further from the axis of the rod thereby increasing the moment about the rod and upsetting the balance of the rod and reel assembly.

In order to control the speed in which the spool of the reel can spin and, in turn, the speed the line can be run-off, especially by a running fish, fly reels generally employ some type of brake or drag mechanism. A drag mechanism applies frictional torque to the spool thereby preventing the spool from freely spinning which can cause line tangles. The appropriate drag torque is set such that a running fish will not create so much tension that the line or the leader will break, yet still provide enough tension to control the speed of line run off.

Typically, the drag mechanisms are adjustable so that the drag torque can be modified to the appropriate amount. For example, many current reels utilize a disk brake system comprising a disk and an adjustable caliper. The disk brake system is usually enclosed within the disc-shaped body of the reel. The disk brake systems can tend to be heavy and can require assemblies having many parts. A simpler dual cone drag mechanism has been described in a brochure of Mt. Rainier Flyreel Works. However, this dual cone drag mechanism suffers from being unstable in that it wobbles creating inconsistent drag and a loose feel.

Therefore, a need exists for an improved fly fishing reel designed specifically to address the aforementioned disadvantages associated with currently available reels. More specifically, the fly fishing reel should improve line retrieval speeds, reduce line coiling problems, improve line handling, while at the same time being light weight and maintaining good overall balance of the rod and reel assembly.

SUMMARY OF THE INVENTION

The present invention is directed to an improved fly fishing reel which provides exceptional performance characteristics over previous designs, is light weight, and when attached to a fly rod results in a well balanced rod and reel assembly. The reel possesses the benefits of a large arbor design while eliminating or reducing the effects of the drawbacks exhibited in previous large arbor designs.

The fly fishing reel of the present invention comprises a spool which has a larger diameter and a broader width than spools found on typical fly fishing reels. The spool of the present invention preferably has an inner spool diameter of about two inches and a width of about one inch for a light weight reel and larger inner diameters and widths for heavier weight reels.

The spool is formed of a tubular element having radially extending walls on both ends to form a line storage channel. Due to the larger diameter and the increased width of the spool, the line storage channel of the spool may be relatively shallow. The present invention has a preferred line storage depth of approximately 0.3". The line storage depth may vary somewhat depending on the line weight design of the reel and the amount of backing line desired. The present invention contemplates a preferred line-storage aspect ratio (ratio of the spool width to the spool depth) of betwee (approximately 2.5:1 and 4:1.)

The spool is rotatably supported by a reel body, preferably through roller bearings, attached at the center of the spool to a spindle. Instead of the typical disc shaped enclosure used in many present fly reel designs, the body comprises an arm-like structure. The reel body configuration of the present invention reduces the weight of the support structure by eliminating unnecessary material.

In a further aspect of the present invention, an innovative mounting member for attaching the reel to a fly fishing rod is provided on the end of the arm-like body opposite the connection to the spool. The mounting member may be integral with the body or it may be a separate part attached to the body. In a further feature, the mounting member may be pivotally connected to the body which enables adjustment of the relationship of the reel to the rod axis to suit the preferences of different individuals.

The configuration of the body and mounting member are uniquely configured so that the longitudinal axis of the fly rod intersects the perimeter of the spool. In previous large spool designs the reel is attached entirely below the fly rod and, therefore, increasing the spool diameter moved the center of mass of the reel further from the axis of the rod. Whereas in previous designs the reel is attached entirely below the fly rod, the present invention moves the center of mass of the reel closer to the axis of the fly rod. Moving the center of mass of the reel closer to the axis of the rod reduces the moment of inertia of the reel about the rod connection point thereby reducing the destabilizing effects exhibited by previous large spool reels.

In an additional aspect of the present invention, an improved drag mechanism is provided. The drag mechanism is a unidirectional brake comprising an inner race member and an outer race member. In a preferred race configuration, the outer race member is fixed to, or integral with, the reel body and the inner race member is disposed between the outer race member and the spindle. In an alternative race configuration, the outer race member is disposed on, and rotates with, the spool.

The outer race member constitutes a female part with an interior race surface defining a conical frictional bearing surface of revolution about the axis of rotation of the spool. The inner race member forms a male part with an exterior race surface defining a conical frictional bearing surface which fits into the outer race member. The inner race surface and outer race surface form opposing parallel conical frictional bearing surfaces.

To create drag, the inner and outer race members are pushed axially relative to one another thereby urging the conical race surfaces into contact. A biasing mechanism is employed to provide axial force to bias the inner race member toward the outer race member, or vice versa. The amount of drag torque may be adjusted by adjusting the biasing mechanism to change the amount of force pushing the race members into contact with each other.

To produce a unidirectional drag mechanism, a roller clutch is disposed between the spindle and the inner race member. In the "reeling in direction," the roller clutch allows the spool to freewheel in the "reeling in direction" such that the inner race member and outer race member do not rotate relative to one another. In the "reeling out direction," the roller clutch locks causing relative rotation of the inner and outer race members which creates frictional drag on the rotation of the spool.

Accordingly, it is an object of the present invention to provide an improved fly fishing reel.

It is a further object of the present invention to provide an improved large arbor fly fishing reel.

An additional object of the present invention is to provide an improved fishing reel drag mechanism.

Yet another object of the present invention is to provide a fly fishing reel having an improved attachment configuration which improves the balance of a rod and reel assembly.

Still another object of the present invention is to provide a light weight reel design.

Further objects and advantages of the present invention will become apparent from a consideration of the drawings and ensuing description.

BRIEF DESCRIPTION OF THE DRAWINGS

FIG. 4 is a right side view of a fly fishing reel having a center axis mounting member in accordance with the present invention attached to a fishing rod.

FIG. 5 is left side view of a fly fishing reel having a center axis mounting member in accordance with the present invention attached to a fishing rod.

DETAILED DESCRIPTION OF THE PREFERRED EMBODIMENTS

Figure 1:
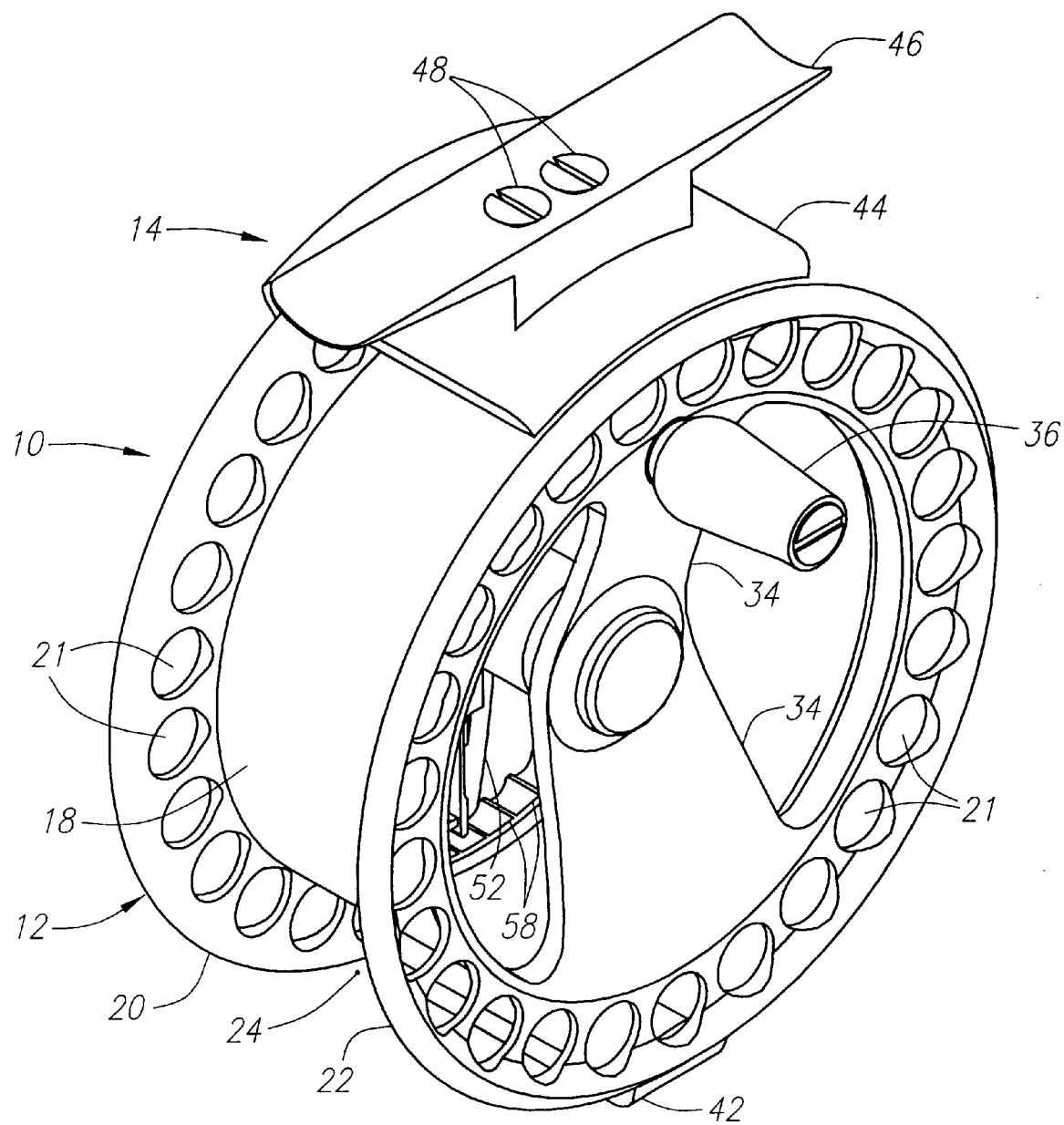
FIG. 1 is a perspective view of a fly fishing reel in accordance with a first preferred form of the present invention.
Figure 2:
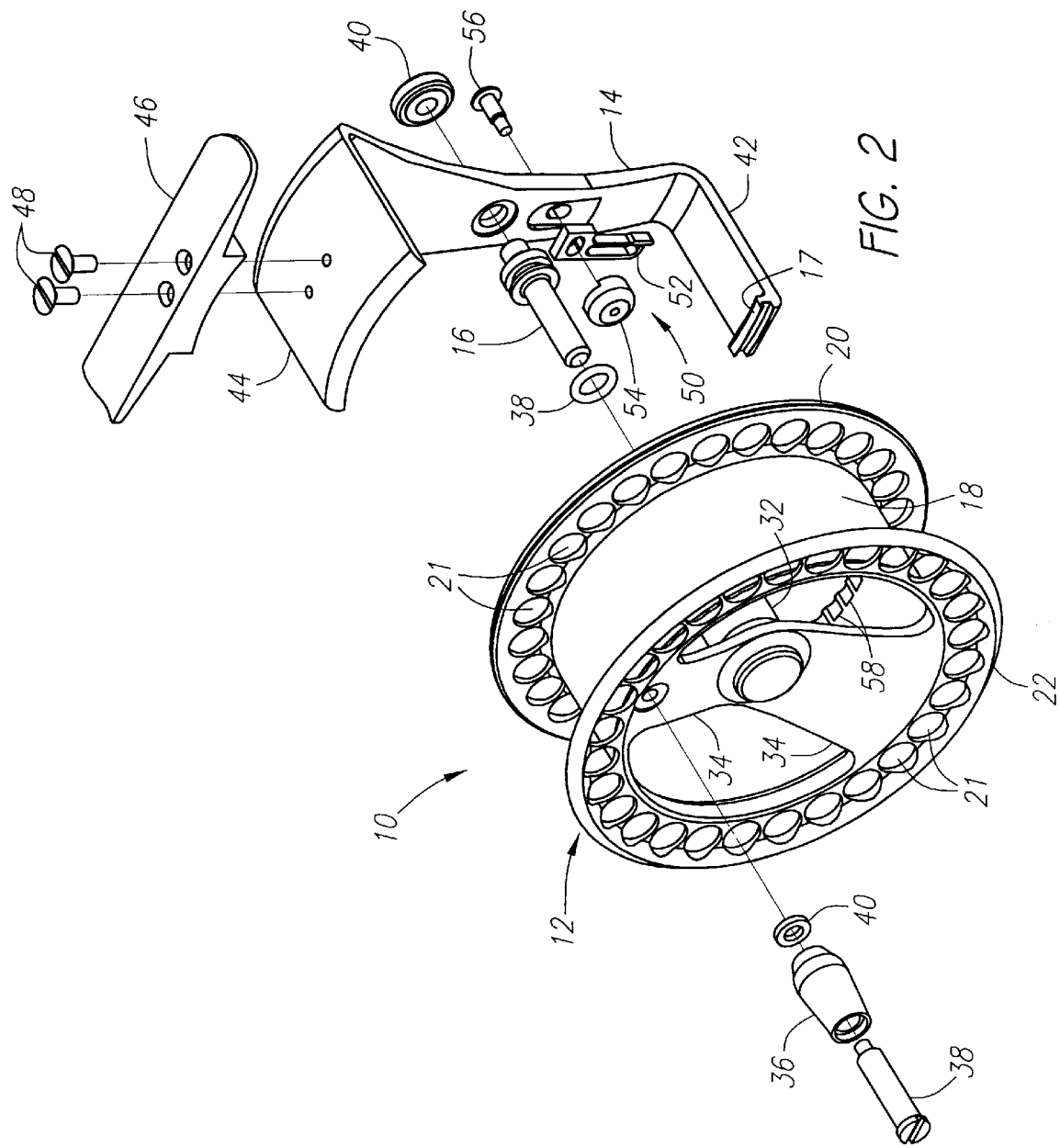
FIG. 2 is an exploded perspective view of a fly fishing reel in accordance the first preferred form of the present invention.
Figure 3:
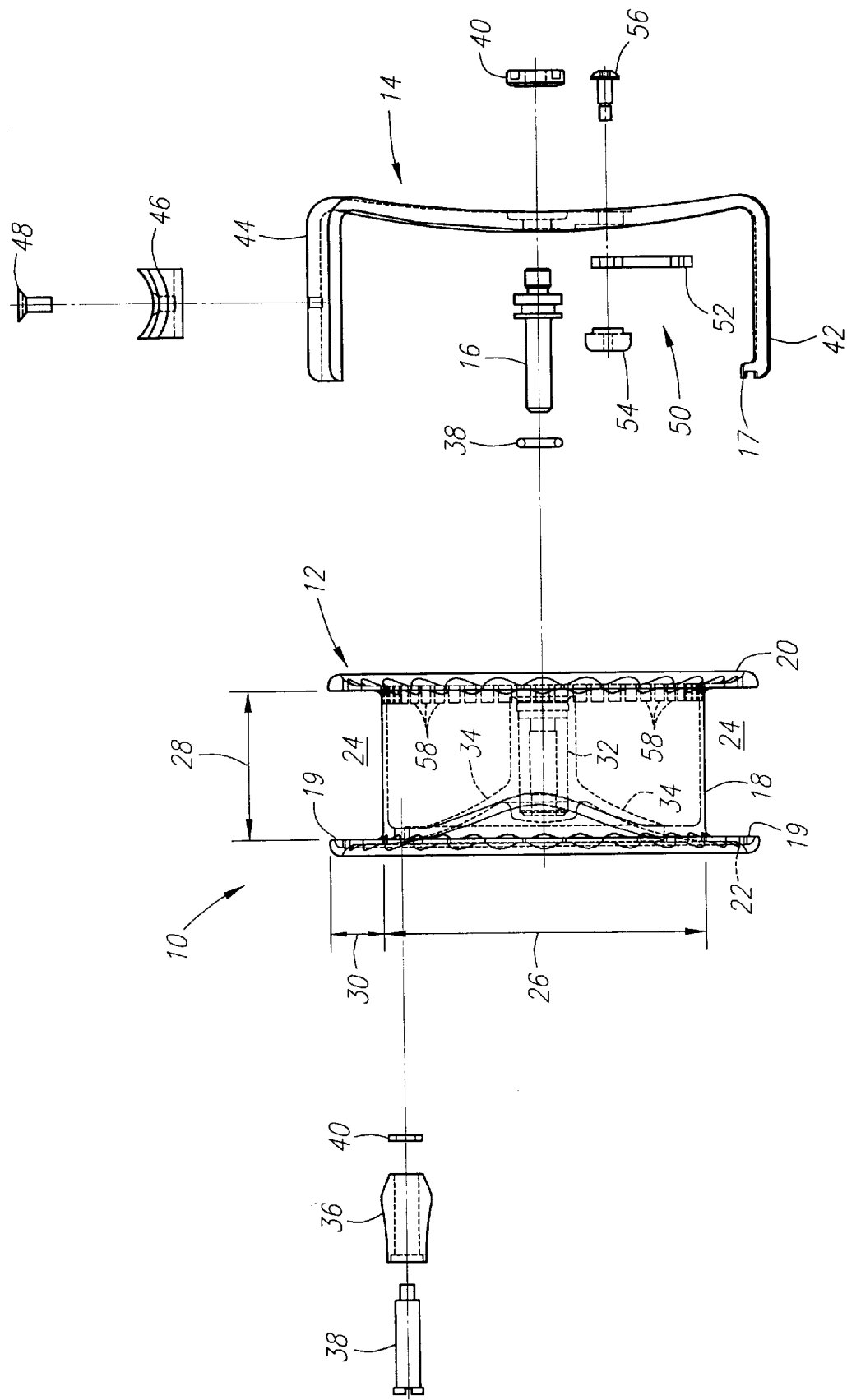
FIG. 3 is an exploded side view of a fly fishing reel in accordance with the first preferred form of the present invention.

Referring now to the drawings, FIGS. 1–3 show a fly fishing reel 10 according to a first preferred embodiment of the present invention. The fly fishing reel 10 comprises an innovative large arbor spool 12 rotatably supported by a reel body 14 through a spindle 16.

The spool 12 comprises a tubular element 18 having radially extending walls 20,22 on each end to form a line storage channel 24. The walls 20, 22 may have holes 21 in them to reduce the weight and provide some styling. The wall 22 has a labyrinth groove 19 which receives a flange 17 to prevent the fly line (not shown) from slipping off the reel 10. The line storage channel 24 has a depth 30 and a width 28.

The tubular element 18 forms the bottom of the line storage channel 24 and has a diameter 26 which is larger than conventional fly fishing reels. Whereas conventional reels have spool inner diameters of about one-half inch, the diameter 26 of the present invention is preferably, approximately: 2" for an 0/1 weight reel; 2.25" for a 3/4 weight reel; 2.4" for a 5/6 weight reel; and appropriately large diameters for any other size reel. Also, the width 28 of the tubular element 18 is wider than for conventional fly fishing reels, and is preferably between about 0.75 inches and 1.2 inches. Hence, the large arbor spool 12 has a larger diameter 26 and larger width 28 than conventional fly fishing reels. As a result of the larger diameter 26 and increased width of the large arbor spool 12, the line storage channel depth 30 may be very shallow relative to conventional fly fishing reels. The aspect ratio of the spool 12, which is the ratio of the spool width 28 to the spool depth 30, is preferably 2.5:1 or greater, and more preferably between approximately 2.5:1 and 4:1.

The tubular element 18 and the walls 20, 22 are connected to a hub 32 by supports 34. Any number of supports 34 may be utilized but two supports 34 are preferred to reduce the overall weight of the reel 10. One of the supports 34 is larger than the other to counterbalance the mass of a hand crank 36 attached to the spool 12.

The hand crank 36 is rotatably attached to the spool 12 using appropriate fasteners such as a screw 38 and washer 40 as shown. The hand crank 36 is preferably attached to one of the supports 34, but may alternatively be attached to the wall 22.

The spool 12 is supported by the reel body 14 by inserting the spindle 16 through the hub 32. The hub 32 may ride directly on the spindle 16, or bearing(s) (not shown) may be provided between the hub 32 and the spindle 16. Furthermore, an o-ring seal 38 may be installed between the spindle 16 and the spool 12 to prevent moisture and dirt from entering the hub 32. The spindle 16 is attached to the body 14 preferably using a nut 40 threaded onto threads of the spindle 16.

The reel body 14 comprises an arm-like structure having a line guide portion 42 and a mounting member portion 44. A conventional mounting foot 46 is attached to the mounting member portion 44 of the body by means of two screws 48, for instance. The reel 10 is attached to a fishing rod (not shown) by affixing the mounting foot 46 to a mating coupling member (not shown) on the fishing rod.

In this embodiment, a clicker drag mechanism 50 is employed. The clicker drag mechanism 50 comprises a clicker 52 attached to the reel body 14 by means of a nut 54 and a bolt 56. The spool 12 is provided with a circular pattern of detentes 58 which receive the clicker 52. The clicker 52 is configured such that it produces significantly greater drag with the detentes 58 when the spool 12 is rotating in the "reeling out direction" than in the "reeling in direction."

In an alternative embodiment of the reel 10 of FIGS. 1–3, the reel body 14 may be configured with an innovative reduced moment mounting member 64, as shown in FIGS. 4 and 5. Instead of the body 14 having the mounting member portion 44 described above with respect to FIGS. 1–3, the reel 60 of FIGS. 4 and 5 has a body 62 having mounting member 64. The reel 60 of FIGS. 3 and 4 is in all respects the same as the reel 10 described above in relation to FIGS. 1 and 2, except for the body and mounting member. The mounting member 64 extends from the body 62 so that the center axis 66 of the mounting member 64 and a handle 72 of a fishing rod 70 attached thereto crosses the circumference of the spool 12. In this way, the center of mass of the reel 60 is closer to the center axis 66 of the fishing rod 70 than in the embodiment of FIGS. 1–3. In the preferred form, the mounting member 64 is configured so that the circumference of the spool 60 does not extend, or extends only a small distance, above the perimeter of the fishing rod handle 72. If the reel is mounted such that the spool 60 extends too far above the handle 72, the spool 60 interferes with the fisherman's wrist, making the reel awkward and uncomfortable to use.

Figure 6:
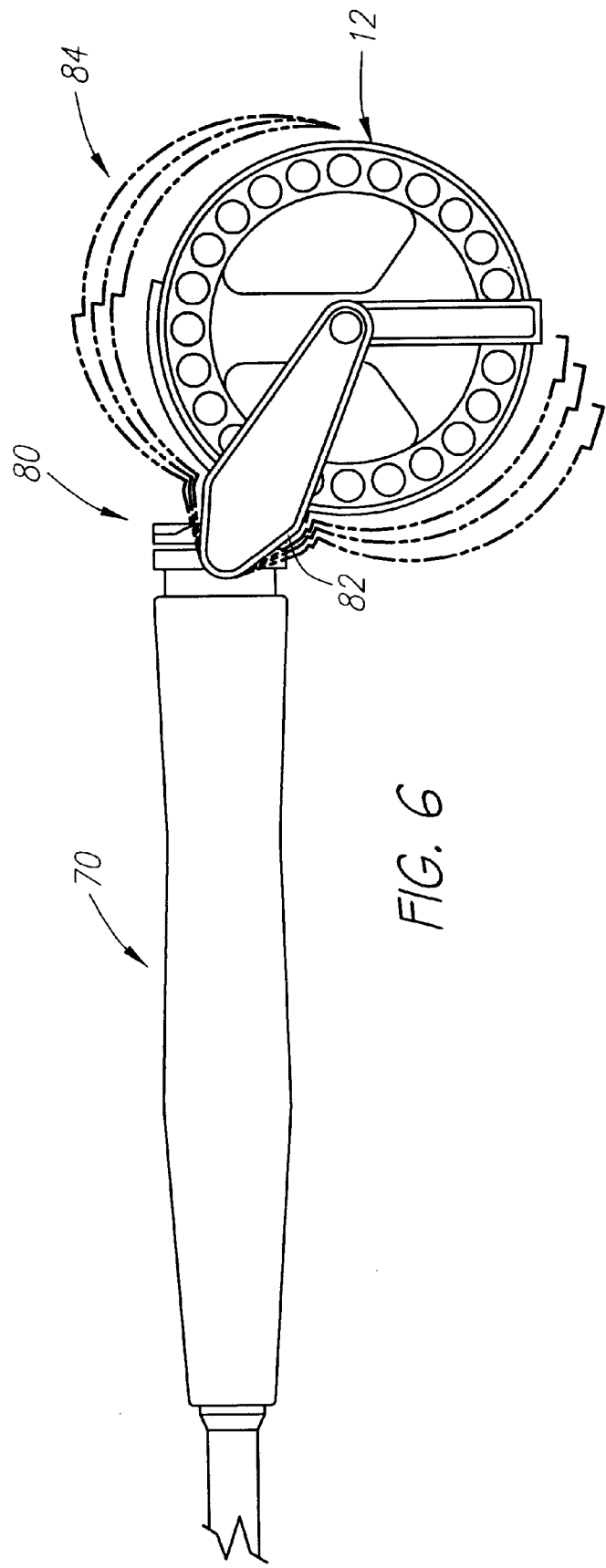
FIG. 6 is a side view of a fly fishing reel having an adjustable mounting member in accordance with the present invention.

In another aspect, the fly fishing reels according to the present invention may have an adjustable mounting member 80 as shown in FIG. 6. The adjustable mounting member 80 is pivotally connected to a body 82. The adjustable mounting member 80 permits the adjustment of the relationship of the reel 84 to the rod 70 to fit each individual fisherman.

Figure 7:
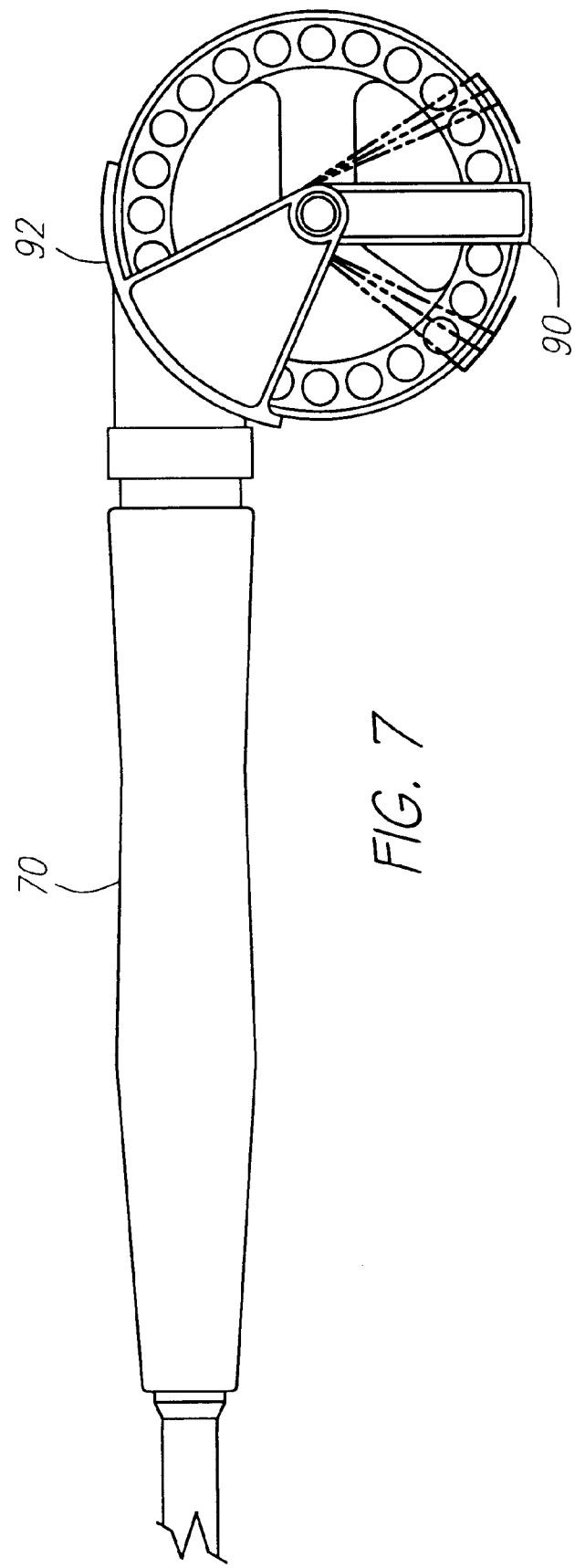
FIG. 7 is a side view of a fly fishing reel having an adjustable line guide in accordance with the present invention.
Figure 8:
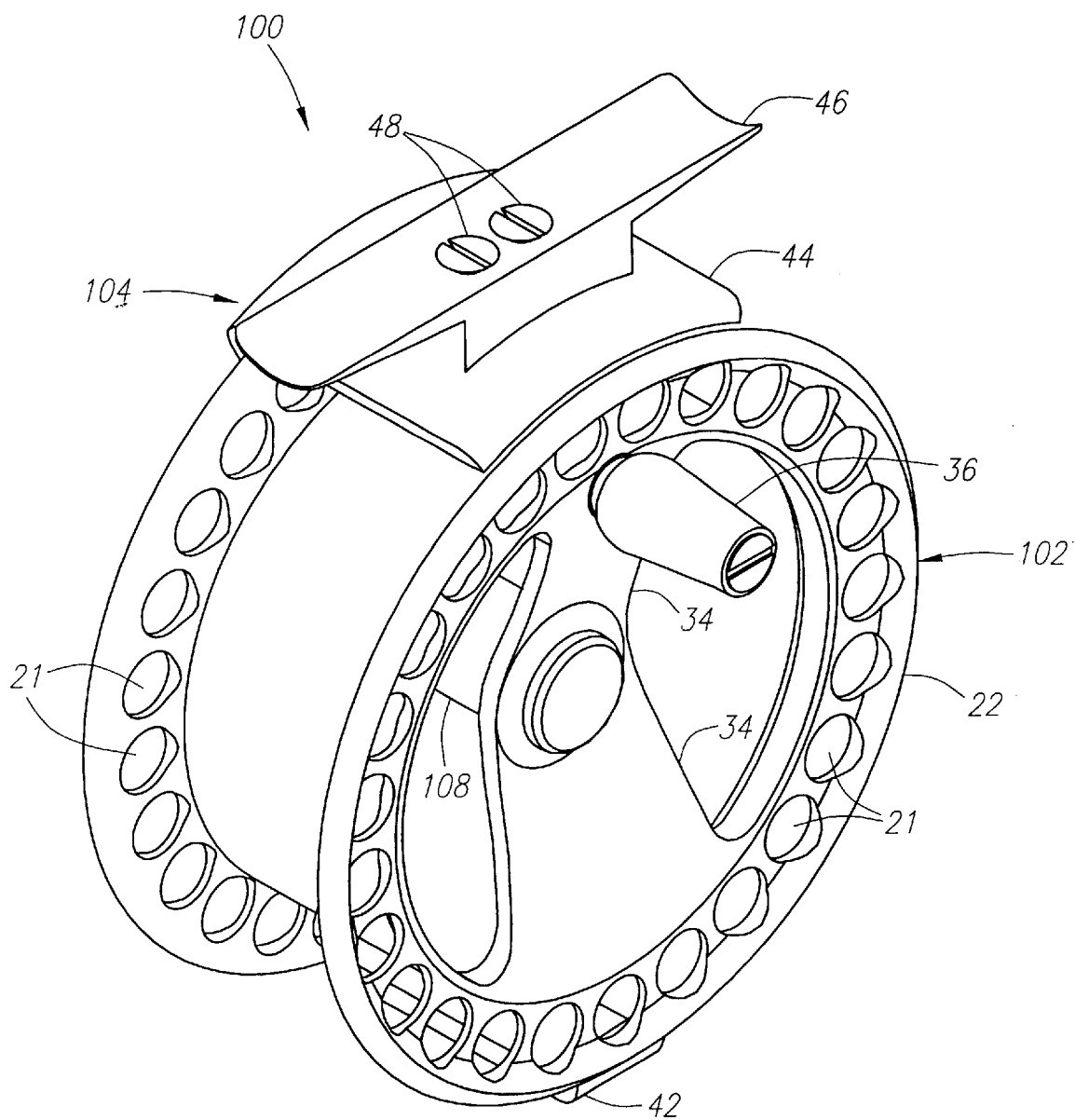
FIG. 8 is a perspective view of a fly fishing reel in accordance with a second preferred form of the present invention.

As shown in FIG. 7, in an additional feature of the present invention, a line guide 90 may be detachable and/or adjustable. Instead of being a fixed member 44 of the reel body 14 as described above, the line guide 90 is pivotally connected to the reel body 92.

The adjustable mounting member 80 and adjustable line guide 90 features can also be used together in the same fishing reel. This allows the fisherman to adjust the line guide 90 to compensate for adjustments in the mounting angle of the reel. Moreover, it is to be understood that the adjustable mounting member 80 and adjustable line guide 90 features, and the center axis mounting member 64 can be adapted for use with any of the embodiments of the fishing reels of the present invention.

Turning now to FIGS. 8–12, a fly fishing reel 100 according to a second preferred embodiment of the present invention is depicted. The fly fishing reel 100 utilizes an innovative dual cone drag mechanism 110.

Similar to the first preferred embodiment described above, the fly fishing reel 100 comprises a large arbor spool 102 rotatably supported by a reel body 104 through a spindle 106. In fact, the reel 100 comprises many of the same elements as the reel 12 described above. Throughout the description and figures, like reference numerals refer to like elements and therefore, some elements are not explicitly described for all figures.

The large arbor spool 102 is in most respects identical to the spool 12 described above except that spool 102 does not have the detentes 58 and it has a different hub. Walls 20,22 of spool 102 may have holes 21 like spool 12 above, even though the holes 21 are not shown in FIGS. 9–12. The spool 102 has a hub 108 connected to supports 34. The spindle 106 is fixed to the hub 108 by threading the spindle 106 into the hub 108 such that the spindle 106 rotates with the hub 108.

The drag mechanism 110 is a unidirectional brake comprising an inner race member 112 and an outer race member 114. The outer race member 114 is fixed to, or integral with, the reel body 104 so that it does not rotate. The inner race member 112 is disposed between the spindle 106 and the outer race member 114.

The inner race member 112 forms a male part having an exterior race surface 116 defining a conical frictional bearing surface of revolution 116 about the axis of rotation of the spool 102. On each end of the exterior race surface 116 is a cylindrical section 115 where the exterior race surface 116 is no longer conical. The outer race member 114 forms a female part which receives the inner race member 112 and has an interior race surface 118 defining a conical frictional bearing surface of revolution about the axis of rotation of the spool 102. On each end of the interior race surface 118 is a cylindrical section 119 where the interior race surface 118 is no longer conical. The exterior race surface 116 and the interior race surface 118 form opposing parallel conical frictional bearing surfaces. The matching cylindrical sections 115 and 119 improve the stability of the drag mechanism 110.

In order to create frictional drag, the inner race member 112 is pulled toward the outer race member 114 by a puller 128. The left end of the puller 128 has a flange which rests against a thrust bearing 130 which in turn bears against a flange on the inner race member 112. The right end of the puller 128 extends through holes in the inner race member 112 and the outer race member 114 and is fastened to the outer race member 114 using a drag adjustment nut 132. The right end of the puller 128 and the hole in the body 104 may be keyed to prevent rotation of the puller 128. The puller 128 provides axial force which pulls the inner race member 112 toward the outer race member 114 thereby forcing the exterior race surface 116 and interior race surface 118 into contact. The amount of drag may be changed by adjusting the drag adjustment nut 132.

The inner race member 112 is preferably made from a plastic material which produces a good friction surface, such as acetal (available from Dupont under the trade name Delron). Because plastic provides a poor surface for press fitting bearings, a sleeve 124, preferably made from metal such as stainless steel or titanium, may be pressed into the inner race member 112. A pair of roller bearings 120 and a roller clutch 126 are press fit into the sleeve 124. Alternatively, the inner race member 112 may be made of aluminum, or other suitable metal, which is coated with a lubricous material such as teflon. In this case, the roller bearings 120 and roller clutch 126 may be press fit directly into the inner race member 112, eliminating the need for the sleeve 124.

To produce a unidirectional drag mechanism, the roller clutch 126 is installed on the spindle 106. Hence, the outer diameter of the roller clutch 126 is fixed to the inner race member 112 and the inner diameter of the roller clutch 126 receives the spindle 106. The inner diameter of the roller clutch 126 is configured such that it locks onto an element inserted into the inner diameter when rotating in one direction and allows the element to freewheel when rotating in the opposite direction.

In the present invention, when the spool 102 and spindle 106 rotate in the "reeling in direction," the spindle 106 freewheels within the roller clutch 126 allowing the spindle 106 and spool 102 to rotate freely, while the inner race member remains static or at least substantially static. The roller clutch 126 locks onto the spindle 106 when the spool 102 and spindle 106 rotate in the "reeling out direction," such that the inner race member 112 rotates with the spool 102 and spindle 106. The inner race member 112 rotates in contact with the outer race member 114 thereby creating drag in the "reeling out direction."

The spool 102 is rotatably supported by the body 104 through roller bearings 120 installed on the spindle 106 and pressed into the inner race member 112. The bearings 120 between the spindle 106 and the inner race member permit the spindle 106 and spool 102 to rotate independently within the inner race member 112 in the "reeling in direction."

The rotating assembly including the spool 102, the spindle 106, the roller bearings 120, the roller clutch 126 and the inner race member 112 are rotatably received in the outer race member 114 of the body 104. The spindle 106 and the inner diameter of the sleeve 124 may be provided with o-ring grooves 122 and 123, respectively, into which an o-ring 125 fits. The o-ring grooves 122 and 124 act as detentes which in conjunction with the o-ring 125 hold the rotating assembly in the body. (see FIG. 12).

Figure 13:
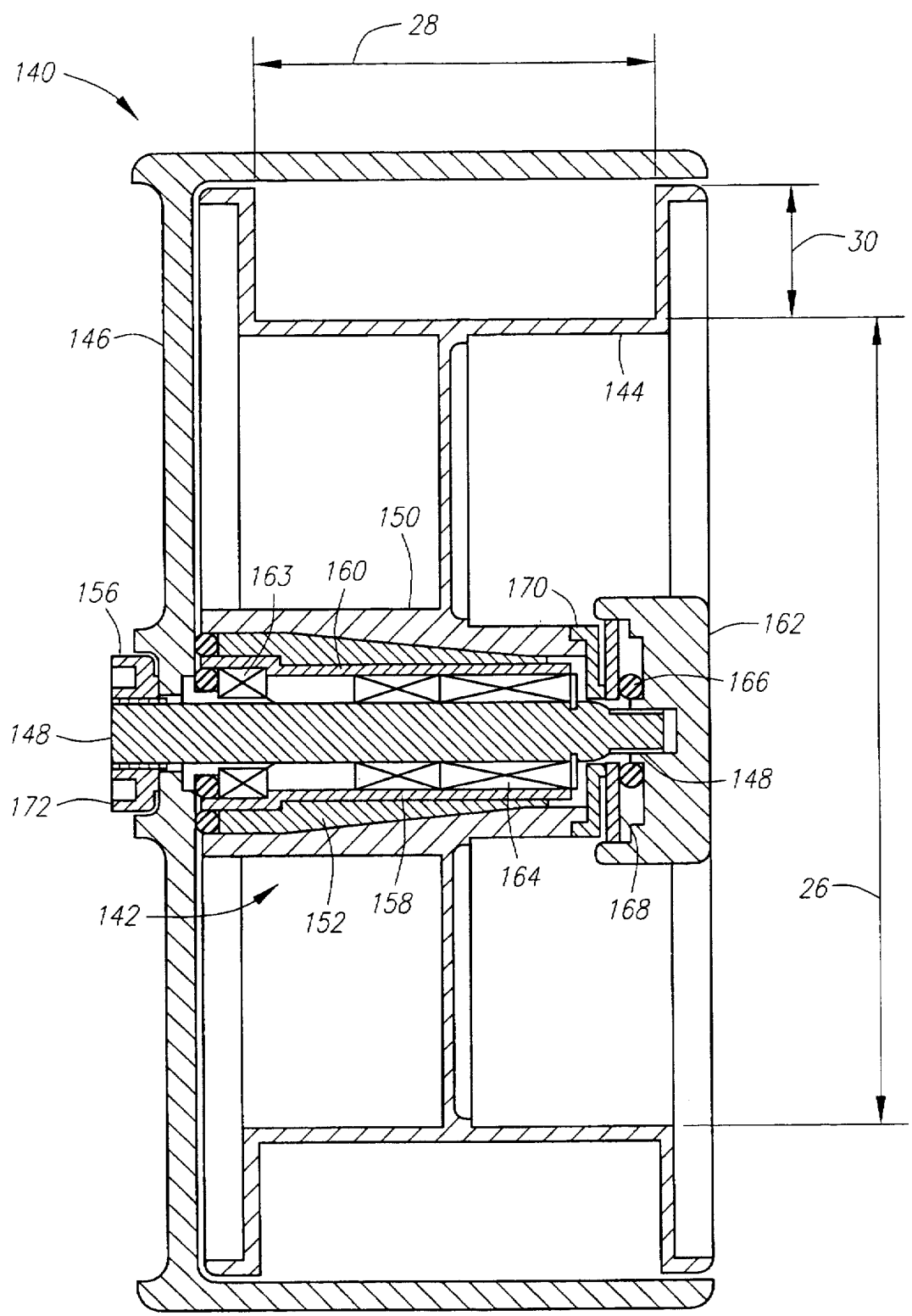
FIG. 13 is a cross-sectional view of a fly fishing reel having an alternative form of a drag mechanism in accordance with the present invention.

A fly fishing. reel 140 having an alternative dual cone drag mechanism 142 is shown in the cross-section of FIG. 13. The reel 140 is similar to the reel 100 described above and comprises a similar large arbor spool 144 supported by a body 146 through a spindle 148. It should be understood that reel 140 may embody all of the features and aspects described for reel 100 and therefore, the descriptions may not be explicitly repeated with respect to reel 140.

The drag mechanism 142 utilizes an alternative race configuration wherein the outer race member 150 is attached to, and rotates with, the spool 144. The outer race member 150 may be integral to the spool 146, or it may be a separate part fixedly attached to the spool 144. The inner race member 152 is disposed between the spindle 148 and the outer race member 150.

The inner race member 152 and outer race member 150 are very similar to those described above, and likewise form opposing parallel conical frictional bearing surfaces. The inner race member 152 and outer race member 150 are forced together into contact by a series of elements, thereby forcing the opposing conical bearing surfaces into contact. A drag adjustment nut 162 delivers axial load against an elastomer o-ring 166 which transmits the axial load to a washer 168. The washer 168 is preferably made of a lubricous material such as delron. The washer 168 delivers the axial load to a raised lip of a cap 170 attached to the end of the outer race member 150. The raised lip reduces the rotating surface area which contacts the washer 168 to reduce the friction while still maintaining a good seal. A counter axial load holds the inner race member 152 in place and is provided by a shoulder of a sleeve 160 pressed into the inner race member 152. The shoulder of the sleeve 160 bears against a roller bearing 163 which bears against a shoulder of the spindle the body 146 which bears against the left bearing 163 which bears against a shoulder of the spindle 148. Another shoulder of the spindle 148 loads against the body 146. A nut 172 threads onto the spindle 148 to attach the spindle 148 to the body 146.

As mentioned previously, the sleeve 160, similar to the sleeve described above, is pressed into the inner race member 152. A roller clutch 158, similar to the one described above, and roller bearings 163 and 164 are press fit into the sleeve 160.

The rotating assembly including the cap 170, the roller bearings 163, 164, and the roller clutch 158 are rotatably installed onto the spindle 148. The spool 144 and the outer race member 150 are rotatably installed onto the inner race member 152 and the drag adjustment nut 162 threads onto the spindle 148 to hold the spool 144 and the outer race member onto the reel 140.

The drag mechanism 142 operates as follows. When the spool 144 and outer race member 150 are rotated in the "reeling in line" direction the roller clutch 158 freewheels about the spindle allowing the inner race member 160 to rotate at least substantially synchronously with the outer race member 150 which also allows the spool 144 to freewheel. When the spool 144 and outer race member 150 are rotated in the "reeling out line" direction, corresponding to the locking direction of the roller clutch 158, the roller clutch 158 locks onto the spindle 158 which prevents the inner race member 152 from rotating whereby the outer race member 150 rotates in contact with the inner race member 152 creating drag.

While the above description contains many specifics, these should not be construed as limitations on the scope of the invention, but rather as examples of preferred embodiments thereof. Many other variations are possible. For example, many of the features described for one of the embodiments may be implemented in another described embodiment. Moreover, many of the aspects and features described in a single embodiment may be included independently or in various combinations other than those included in the preferred embodiments described herein. For instance, a fly fishing reel in accordance with the present invention may comprise the following combinations: a large arbor reel without the disclosed drag mechanism; a spool having the disclosed aspect ratios without the unique rod attachment configuration; the cone drag mechanism independent of the large arbor spool; or the arm-like body independent of any of the other aspects and feature described herein.

Accordingly, the scope of the present invention should be determined not by the embodiments illustrated above, but by the appended claims and their legal equivalents.

What is claimed is:

1. A fly fishing reel comprising:
    a body having a mounting member for attaching the reel to a fishing rod;
    a spool rotatably supported by a body, said spool including a line storage channel having a width and a depth in which line is stored;
    wherein the ratio of said width to said depth is approximately 2.5:1; and
    a drag mechanism, said drag mechanism including an inner race member having an exterior conical bearing surface and an outer race member having an interior conical bearing surface, said inner race member received within said outer race member such that said exterior surface is in contact with said interior race surface, said outer race member being attached to said body and said inner race member being unidirectionally coupled to said spool.

2. The fishing reel of claim 1 wherein said body comprises an arm-like structure having a plurality of support members extending radially outward from an axis of rotation of said spool.

3. The fishing reel of claim 1 wherein said ratio of said width to said depth is between approximately 2.5:1 and approximately 4:1.

4. The fishing reel of claim 1 further comprising a drag means disposed between said spool and said body for creating rotational drag on said spool.

5. The fishing reel of claim 1 wherein said drag mechanism further comprises an adjustable biasing mechanism operatively coupled to said inner race member to provide adjustable axial force tending to force the inner race member into contact with the outer race member.

6. The fishing reel of claim 5 wherein said biasing mechanism is a puller having one end coupled to said inner race member and a second end coupled to said body using a drag adjustment device.

7. The fishing reel of claim 1 wherein said inner race member has a cylindrical section on both ends of said exterior conical bearing surface and said outer race member has a cylindrical section on both ends of said interior conical bearing surface which receives the cylindrical sections on said inner race member.

8. The fishing reel of claim 1 wherein said mounting member is adapted to position the reel when attached to the fishing rod such that a longitudinal axis of the fishing rod intersects a perimeter of the spool and such that the perimeter of the spool extends only a small distance above a perimeter of a fishing rod handle connected to said fishing rod.

9. The fishing reel of claim 1 wherein said inner race member is unidirectionally coupled to said spool using a roller clutch disposed between said spool and said inner race member.

10. A fly fishing reel comprising:
    a body having a mounting member for attaching the reel to a fishing rod;
    a spool rotatably supported by said body; and
    a drag mechanism disposed between said spool and said body for creating rotational drag on said spool, said drag mechanism including an inner race member having an exterior conical bearing surface and an outer race member having an interior conical bearing surface, said inner race member received within said outer race member such that said exterior race surface is in contact with said interior race surface, said outer race member being attached to said body and said inner race member being unidirectionally coupled to said spool.

11. The fishing reel of claim 10 wherein said drag mechanism further comprises an adjustable biasing mechanism operatively coupled to said inner race member to provide adjustable axial force tending to force the inner race member into contact with the outer race member.

12. The fishing reel of claim 11 wherein said biasing mechanism is a puller having one end coupled to said inner race member and a second end coupled to said body using a drag adjustment device.

13. The fishing reel of claim 10 wherein said inner race member has a cylindrical section on both ends of said exterior conical bearing surface and said outer race member has a cylindrical section on both ends of said interior conical bearing surface which receives the cylindrical sections on said inner race member.

14. The fishing reel of claim 10 wherein said body comprises an arm-like structure having a plurality of support members extending radially outward from an axis of rotation of said spool.

15. The fishing reel of claim 14 wherein said spool includes a line storage channel having a width and a depth in which line is stored, and wherein the ratio of said width to said depth is between approximately 2.5:1 and approximately 4:1.

16. A fly fishing reel comprising:
a body having a mounting member for attaching the reel to a fishing rod;
said mounting member being adapted to position the reel when attached to the fishing rod such that a longitudinal axis of the fishing rod intersects a perimeter of the spool, and such that the perimeter of the spool extends only a small distance above a perimeter of a fishing rod handle connected to said fishing rod;
a spool rotatably supported by a body;
said spool including a line storage channel having a width and a depth in which line is stored;
a drag mechanism, said drag mechanism including an inner race member having an exterior conical bearing surface and an outer race member having an interior conical bearing surface, said inner race member received within said outer race member such that said exterior race surface is in contact with said interior race surface, said outer race member being attached to said body and said inner race member being unidirectionally coupled to said spool.

17. The fishing reel of claim 16 wherein the ratio of said width to said depth is between approximately 2.5:1 and approximately 4:1.

18. The fishing reel of claim 16 wherein said drag mechanism further comprises an adjustable biasing mechanism operatively coupled to said inner race member to provide adjustable axial force tending to force the inner race member into contact with the outer race member.

19. The fishing reel of claim 18 wherein said biasing mechanism is a puller having one end coupled to said inner race member and a second end coupled to said body using a drag adjustment device.

20. The fishing reel of claim 16 wherein said inner race member has a cylindrical section on both ends of said exterior conical bearing surface and said outer race member has a cylindrical section on both ends of said conical bearing surface which receives the cylindrical sections on said inner race member.

21. The fishing reel of claim 16 wherein said body comprises an arm-like structure having a plurality of support members extending radially outward from an axis of rotation of said spool.

22. A fly fishing reel comprising:
a spool rotatably supported by a body;
said spool including a line storage channel having a width and a depth in which line is stored;
said body comprising an arm-like structure having a plurality of support members extending radially outward from an axis of rotation of said spool;
a mounting member attached to said body for attaching the reel to a fishing rod; and
a drag mechanism, said drag mechanism including an inner race member having an exterior conical bearing surface and an outer race member having an interior conical bearing surface, said inner race member received within said outer race member such that said exterior race surface is in contact with said interior race surface, said outer race member being attached to said body and said inner race member being unidirectionally coupled to said spool.

* * * * *

UNITED STATES PATENT AND TRADEMARK OFFICE
CERTIFICATE OF CORRECTION

PATENT NO. : 5,915,639
DATED : June 29, 1999
INVENTOR(S) : Mark S. Farris

Figure 9:
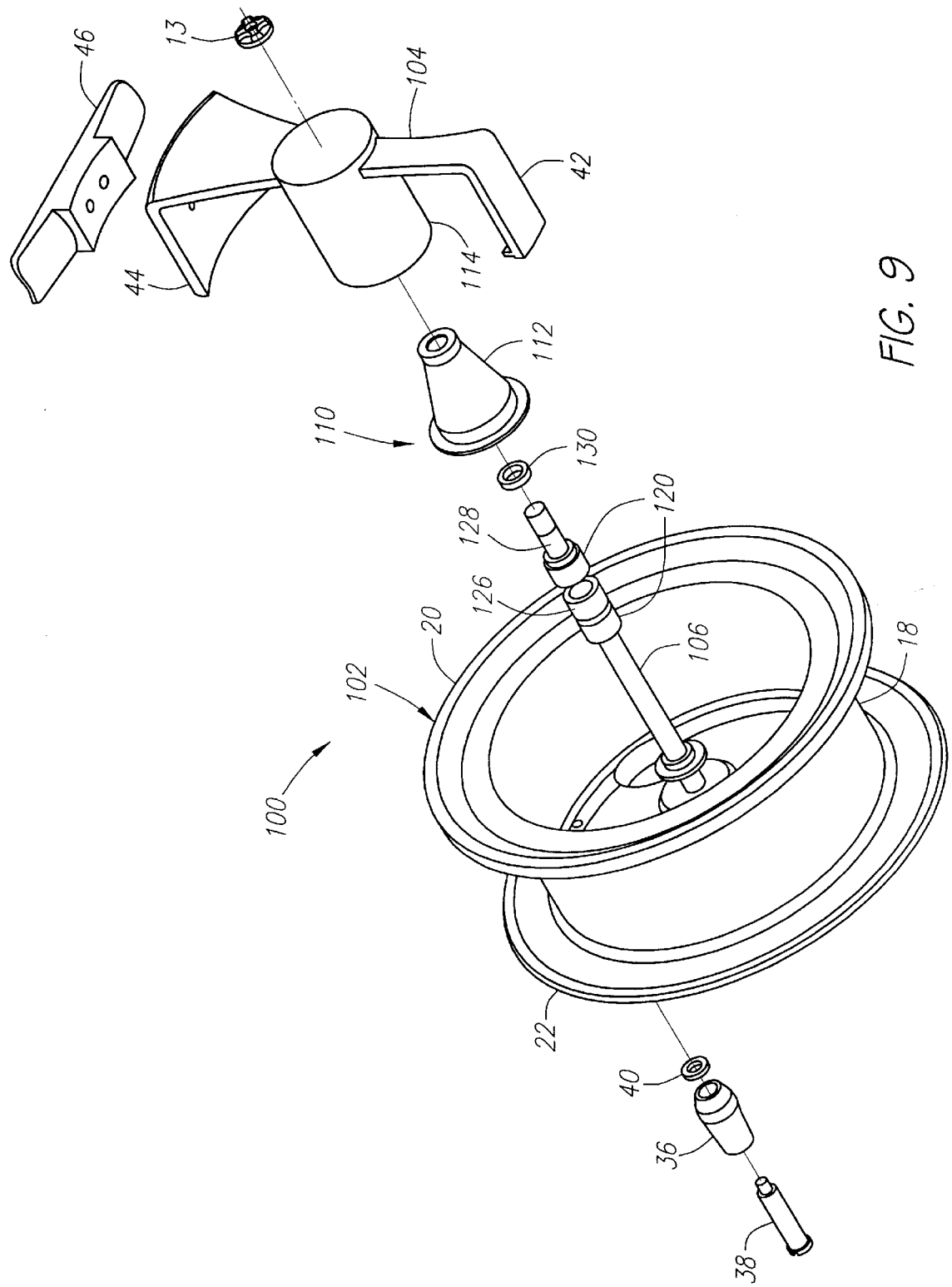
FIG. 9 is an exploded perspective view of a fly fishing reel in accordance the preferred form of the present invention.
Figure 10:
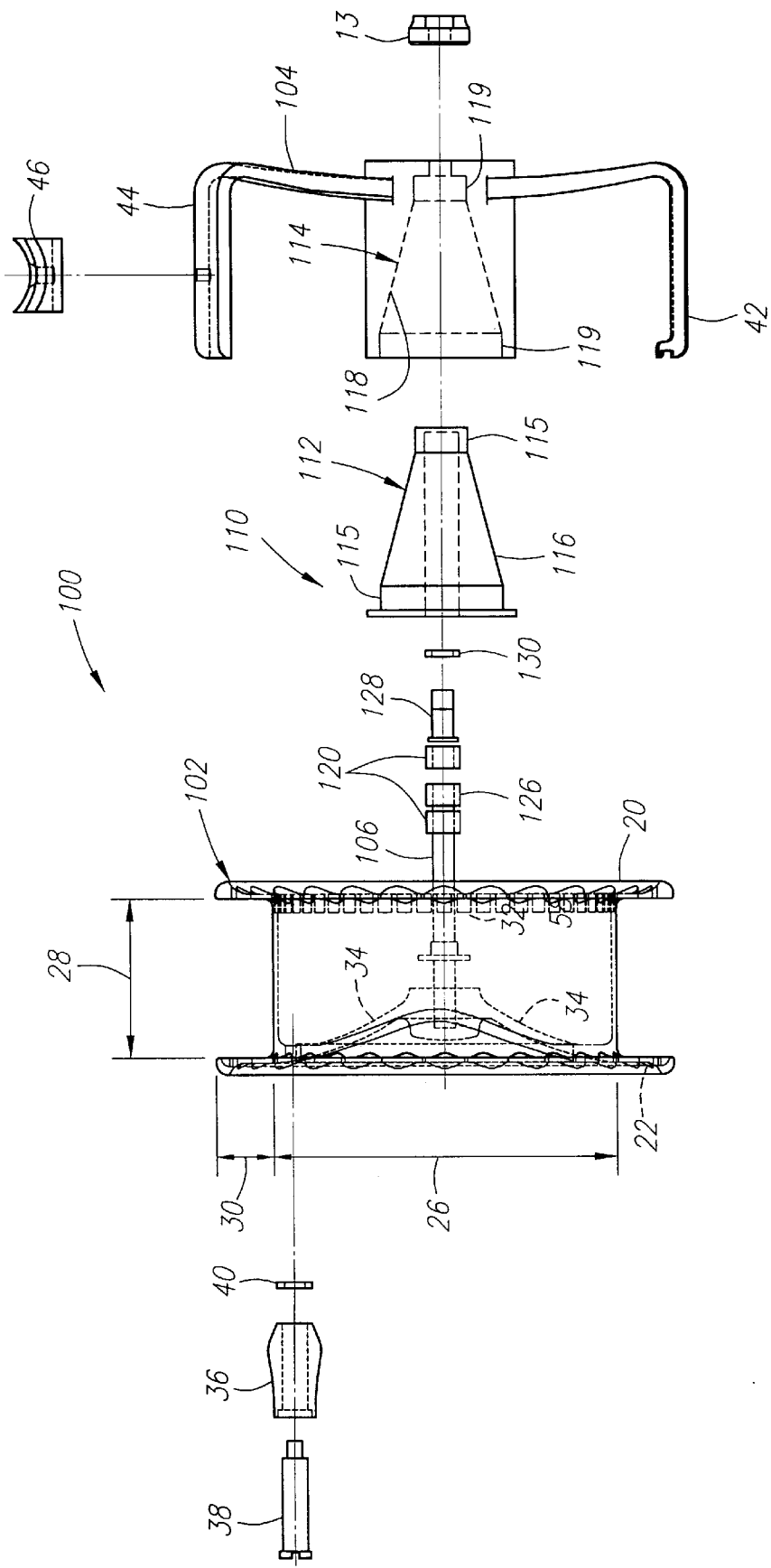
FIG. 10 is an exploded side view of a fly fishing reel in accordance with the second preferred form of the present invention.
Figure 11:
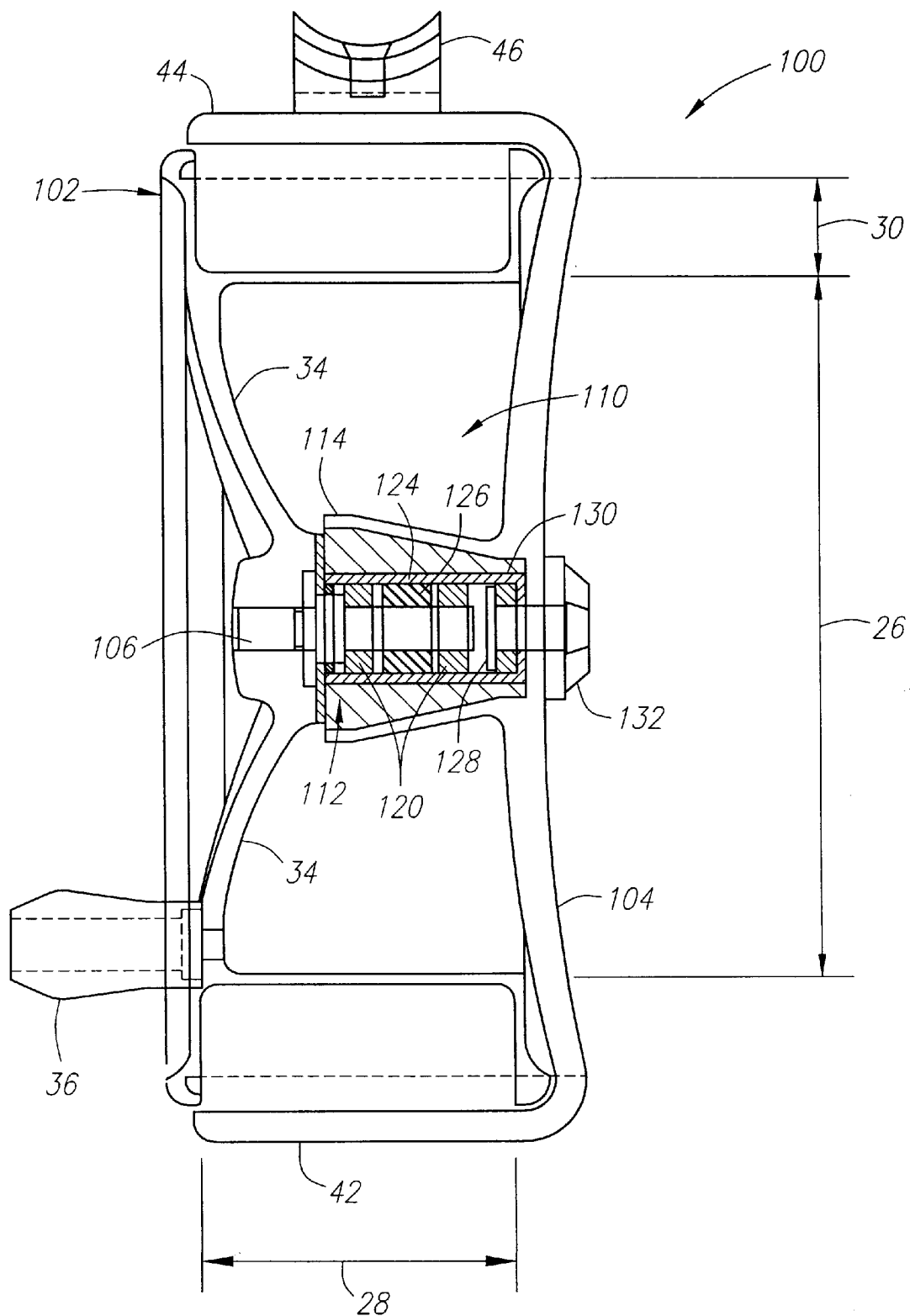
Fig. 11 is a cross-sectional view along line 11—11 in FIG. 10.
Figure 12:
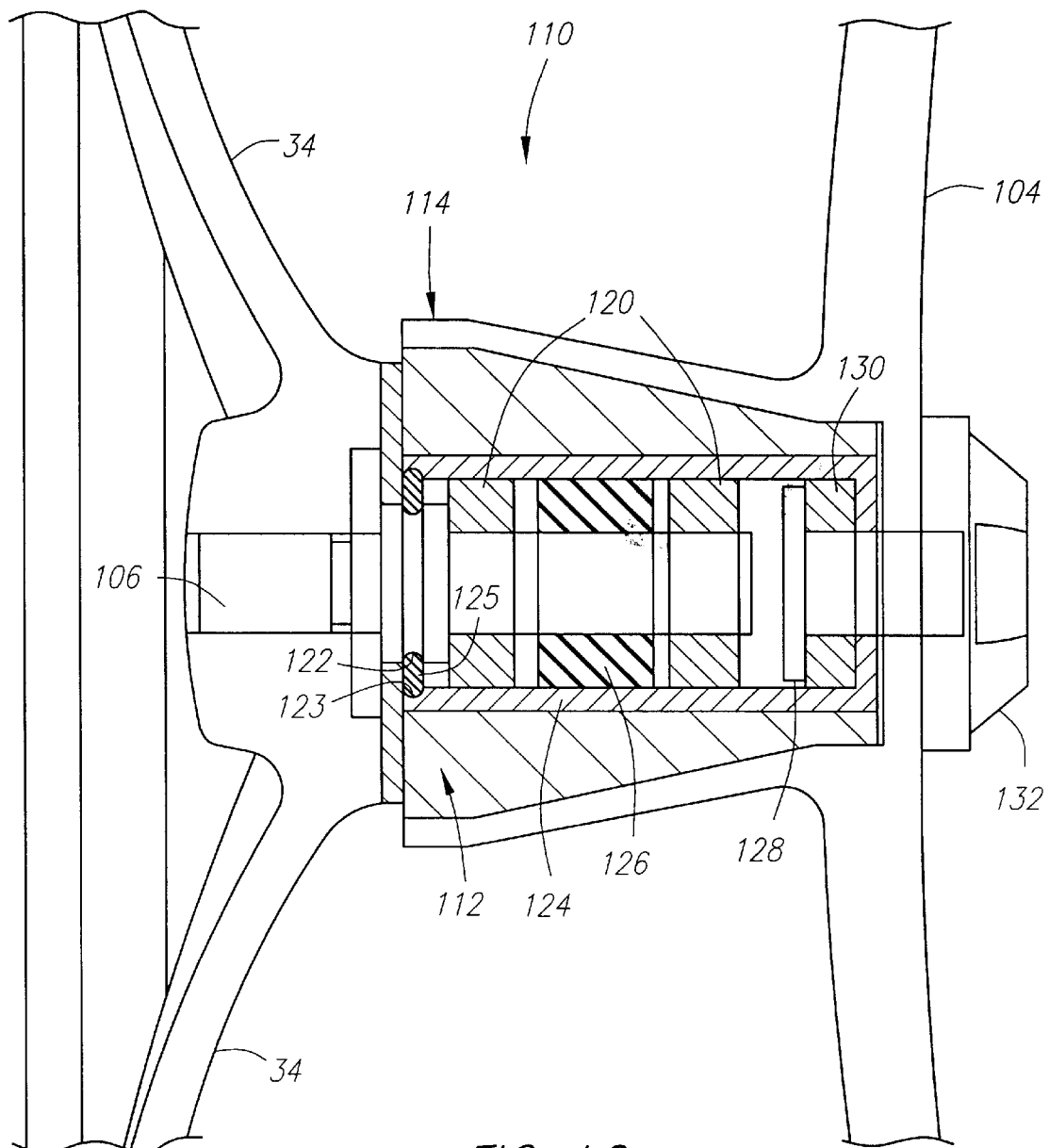
FIG. 12 is an enlarged cross-sectional view.

It is certified that error appears in the above-identified patent and that said Letters Patent is hereby corrected as shown below:

Drawings,
In FIG. 9, please change the numerical reference "18" to -- 108 --.
Please add the attached formal drawing of FIG 13.

Column 3,
Line 43, please change "betwee" to -- between --.
Line 44, please delete the parentheses before "approximately" and after "4:1."

Column 6,
Lines 51 and 52, please change "spool 60" to -- spool 12 --.

Column 7,
Line 16, please change "reel 12" to -- reel 10 --.

Column 8,
Line 45, please change "124" to -- 123 --.

Column 9,
Line 36, please change "160" to -- 152 --.
Line 42, please change "158" to -- 148 --.

Column 11,
Line 39, after stored; please add -- and --.

Signed and Sealed this

Sixth Day of November, 2001

Attest:

NICHOLAS P. GODICI
Attesting Officer   Acting Director of the United States Patent and Trademark Office